US012774720B2

(12) United States Patent
Montboeuf et al.

(10) Patent No.: US 12,774,720 B2
(45) Date of Patent: Oct. 27, 2026

(54) ROLLER BEARING HAVING AN ASYMMETRICAL RACEWAY, IN PARTICULAR FOR A STEERING COLUMN

(71) Applicant: AKTIEBOLAGET SKF, Gothenburg (SE)

(72) Inventors: Bruno Montboeuf, Saint-Cyr-sur-Loire (FR); Baptiste Vidil, Levallois-Perret (FR); Thomas Lepine, Tours (FR); Lucia Knoblauch, Buchheim (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 19/070,776

(22) Filed: Mar. 5, 2025

(65) Prior Publication Data

US 2025/0290546 A1 Sep. 18, 2025

(30) Foreign Application Priority Data

Mar. 13, 2024 (FR) ...................................... 2402492

(51) Int. Cl.

*F16C 19/06* (2006.01)
*B62D 1/16* (2006.01)
*F16C 25/08* (2006.01)
*F16C 33/58* (2006.01)
*F16C 33/61* (2006.01)

(52) U.S. Cl.

CPC .............. *F16C 33/585* (2013.01); *B62D 1/16* (2013.01); *F16C 19/06* (2013.01); *F16C 25/083* (2013.01); *F16C 33/61* (2013.01); *F16C 2240/76* (2013.01); *F16C 2326/24* (2013.01)

(58) Field of Classification Search

CPC ...... F16C 19/06; F16C 19/163; F16C 33/583; F16C 33/585; F16C 33/61; F16C 2326/24; B62D 1/16

See application file for complete search history.

(56) References Cited

U.S. PATENT DOCUMENTS 5,458,422 A 10/1995 Zernickel et al.
7,568,550 B2 * 8/2009 Yasuda ................ B62D 5/0409 384/450

(Continued)

FOREIGN PATENT DOCUMENTS

DE 19604036 A1 8/1996
EP 1956254 A1 * 8/2008 ............. F16C 33/41

OTHER PUBLICATIONS

Description_EP1956254A1.*

(Continued)

*Primary Examiner* — Phillip A Johnson
(74) *Attorney, Agent, or Firm* — J-TEK LAW PLLC; Scott T. Wakeman; Mark A. Ussai

(57) ABSTRACT

A roller bearing for a steering column includes a first ring, a second ring and at least one row of balls arranged between the two rings. The second ring including a casing, at least one insert arranged in the casing so as to form a raceway of the second ring, and at least one prestressing element mounted in the casing and exerting an axial force on the insert. The first ring has a raceway for the balls, the raceway having in cross-section a concave inner profile that is asymmetrical relative to a plane parallel to a radial plane passing through the center of the balls.

7 Claims, 4 Drawing Sheets

(56) References Cited

U.S. PATENT DOCUMENTS

| | | | | |
|---|---|---|---|---|
| 2014/0037240 | A1 * | 2/2014 | Bussit | F16C 33/60 384/499 |
| 2016/0017915 | A1 | 1/2016 | Bussit et al. | |
| 2016/0305474 | A1 | 10/2016 | Lutz et al. | |

OTHER PUBLICATIONS

Preliminary Search Report from the French Patent Office dated Oct. 2, 2024 in related French application No. FR2402492, including Search Report and Written Opinion.

* cited by examiner

ROLLER BEARING HAVING AN ASYMMETRICAL RACEWAY, IN PARTICULAR FOR A STEERING COLUMN

CROSS-REFERENCE

This application claims priority to French patent application no. 2402492 filed on Mar. 13, 2024, the contents of which are fully incorporated herein by reference.

BACKGROUND OF THE INVENTION

The present invention relates to roller bearings, more particularly to roller bearings used in the steering columns of motor vehicles.

Steering columns generally comprise a shaft, one end of which is rigidly connected to a steering wheel actuated by the driver of the vehicle, and the other end of which is rigidly connected to mechanical members intended to perform the angular positioning of the wheels of the vehicle. Typically, the shaft of the steering column is rotatably mounted in a tubular housing by means of two roller bearings.

One type of roller bearing for a steering column comprises an inner ring, an outer ring and a row of balls arranged between raceways of the rings, at least one of the rings comprising a casing and inserts arranged in the casing so as to form raceways of the ring. A roller bearing having three or four points of contact is thus produced, capable of operating under axial and/or radial loads. Generally, such a bearing also comprises a resilient prestressing element mounted inside the casing and pressing axially against one of the inserts so as to obtain operation with limited movement.

The architecture of such a roller bearing makes it possible to prevent free play in the bearing, but does not completely limit the axial and radial movements between the rings even when the preload of the bearing is adjusted after assembly.

SUMMARY OF THE INVENTION

The present invention aims to overcome the drawbacks described above.

Specifically, the present invention relates to a roller bearing, in particular for a steering column, comprising a first ring, a second ring and at least one row of balls arranged between the rings, the second ring comprising a casing and at least one insert arranged in the casing so as to form a raceway of the second ring, and at least one prestressing element mounted in the casing and exerting an axial force on the insert.

"Insert" is given to mean an element separate from the casing.

According to one general feature, the first ring is provided with a raceway for the balls having in cross-section a concave inner profile that is asymmetrical relative to a plane parallel to a radial plane passing through the center of the balls.

The osculation, which is the ratio between the curvature of the raceway and the diameter of the balls, thus has a different value on the two sides of the radial plane passing through the center of the balls.

Advantageously, in cross-section, the concave inner profile of the raceway of the first ring comprises a first arc having a first radius located axially on the same side as the prestressing element and a second arc having a second radius located axially on the opposite side from the prestressing element, the first and second arcs having different centers and the first radius being greater than the second radius.

The asymmetrical concave inner profile of the raceway of the first ring makes it possible to limit the relative axial movement of the rings.

Insofar as the smallest radius of the raceway is situated axially on the opposite side from the prestressing element, during operation the balls of the row will tend to rise more quickly on this part of the raceway, which will cause greater compression of the prestressing element and in return a greater prestressing force exerted by the element.

The roller bearing will thus allow less axial deflection for equivalent prestressing without compromising the frictional torque. This also makes it possible to increase the axial stiffness of the bearing.

By way of example, the radius of the first arc of the raceway of the first ring is between 110% and 130% of the radius of the second arc, and in particular equal to 120%.

Advantageously, the first ring comprises an annular surface starting from which the raceway is formed, the arcs joining the annular surface. Alternatively, a joining surface can be envisaged between each arc and the annular surface.

Optionally, each arc joins the annular surface by means of a chamfer.

In one embodiment, the arcs of the concave inner profile of the raceway join each other at a point belonging to the plane parallel to the radial plane passing through the center of the balls. Alternatively, a cylindrical joining surface can be envisaged between the arcs.

In one embodiment, the second ring comprises two inserts that are arranged in the casing on either side of the radial plane passing through the center of the balls.

Preferably, the two inserts of the second ring are identical, i.e., formed identically.

In one embodiment, the first ring is the inner ring of the roller bearing and the second ring is the outer ring of the roller bearing.

The present invention further relates to a steering column comprising a housing, a shaft coaxial with the housing and at least one roller bearing as defined above, mounted radially between the housing and the shaft.

BRIEF DESCRIPTION OF THE SEVERAL VIEWS OF THE DRAWINGS

Further aims, features and advantages of the invention will become apparent on reading the following description, which is given solely by way of non-limiting example, and with reference to the appended drawings, in which.

DETAILED DESCRIPTION OF THE INVENTION

Figure 1:
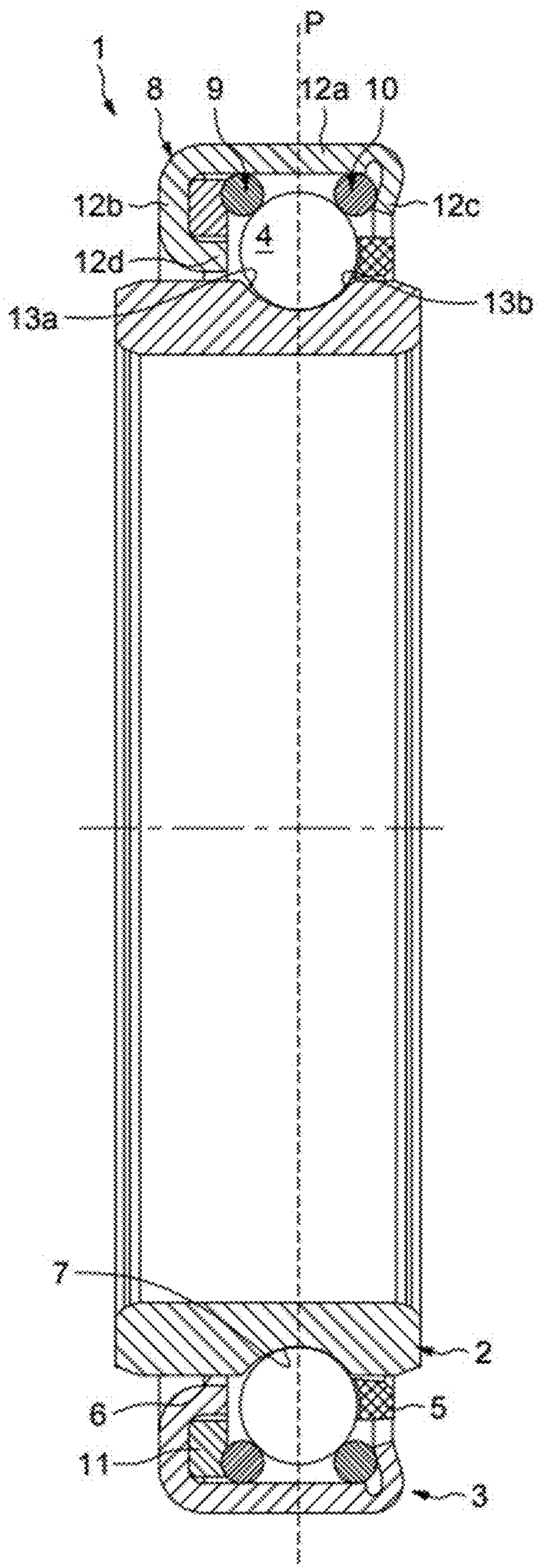
FIG. 1 is an axial cross-sectional view of a roller bearing according to one exemplary embodiment.

FIG. 1 illustrates a roller bearing, denoted by numerical reference sign 1, comprising a first ring 2, a second ring 3, and a row of balls 4 arranged between the rings 2, 3. In this embodiment, the roller bearing 1 preferably also comprises a cage 5 arranged radially between the rings 2, 3 in order to maintain even circumferential spacing between the balls 4. Alternatively, the roller bearing 1 could be provided without a cage.

In this embodiment, the first ring 2 is the inner ring of the roller bearing 1 and the second ring 3 is the outer ring of the roller bearing 1.

The inner ring 2 includes a cylindrical bore axially delimited by opposing radial front faces and an outer axial annular surface 6, a toroidal circular groove extending radially from the annular surface 6 and having in cross-section a concave inner profile suitable for forming a raceway 7 for the balls 4, the groove being oriented so as to face radially outwardly.

As will be described in more detail below, the raceway 7 of the inner ring 2 has a concave inner profile with a cross-section that is asymmetrical relative to a plane P' that is parallel to a radial plane P passing through the center of the balls 4.

The inner ring 2 is preferably solid. As used herein, a “solid ring” is means a ring the shape of which is obtained by machining with stock removal (turning, grinding) of tubes, bars or forged and/or rolled blanks.

The outer ring 3 includes an outer casing 8 and preferably two separate inserts 9, 10 forming raceways of the ring 3 for the balls 4. Preferably, each one of the inserts 9, 10 is in the form of a separate wire. The outer ring 3 also comprises a prestressing element 11 exerting an axial force on one of the inserts 9, 10. The inserts 9, 10 and the prestressing element 11 are all mounted inside of the casing 8.

The casing 8 is preferably manufactured by cutting and shaping a metal sheet. The casing 8, which is annular, includes an outer axial portion 12*a* and two radial portions 12*b*, 12*c* extending radially inwardly from a separate end of the axial portion 12*a*. The two preferred inserts 9, 10 are arranged in radial contact with the bore of the axial portion 12*a* and are arranged in the casing 8 on either side of a radial plane P passing through the center of balls 4. The radial portion 12*c* has a radial dimension that is less than a radial dimension of the radial portion 12*b*. The radial portion 12*c* also has a reduced thickness and is slightly curved in the direction of the balls 4 so as to press against the insert 10 and axially prestress the bearing 1. The cage 5 is arranged radially between the free, inner edge of the radial portion 12*c* of the casing 8 and the outer surface of the inner ring 2.

The casing 8 also includes an inner axial portion 12*d* extending axially inwardly from a small diameter edge of the radial portion 12*b*. The axial portion 12*d* is provided for centering the prestressing element 11 inside of the casing 8.

The prestressing element 11 is preferably annular and is mounted axially in contact with the radial portion 12*b* of the casing 8 and with the insert 9 and is located radially between the outer axial portion 12*a* and inner axial portion 12*d* while being spaced apart from each portion 12*a*, 12*d*. One radial surface of the prestressing element 11 is in axial contact with the inner face of the radial portion 12*b* of the casing 8 and an opposite radial surface is in axial contact with the insert 9. The prestressing element 11 is spaced apart from the balls 4. The prestressing element 11 exerts a permanent axial force on the insert 9 that tends to prestress the balls 4 against the other insert 10 and against the groove of the inner ring 2.

The prestressing element 11 is advantageously formed from a resilient material, for example an elastomer such as nitrile rubber or polyurethane. In the illustrated embodiment, the prestressing element 11 is in the form of a torus having a square cross-section. Alternatively, the prestressing element 11 may have a different cross-sectional profile, for example circular.

The inserts 9, 10 are each in the form of open torus and are mounted inside the casing 8 in direct contact against the casing 8. The balls 4 are arranged between the inserts 9, 10 of the outer ring 3 that form raceways and the raceway 7 of the inner ring 2. A roller bearing 1 having three points of contact is thus produced. In the illustrated exemplary embodiment, the inserts 9, 10 are identical or identically formed so as to reduce manufacturing costs.

Figure 2:
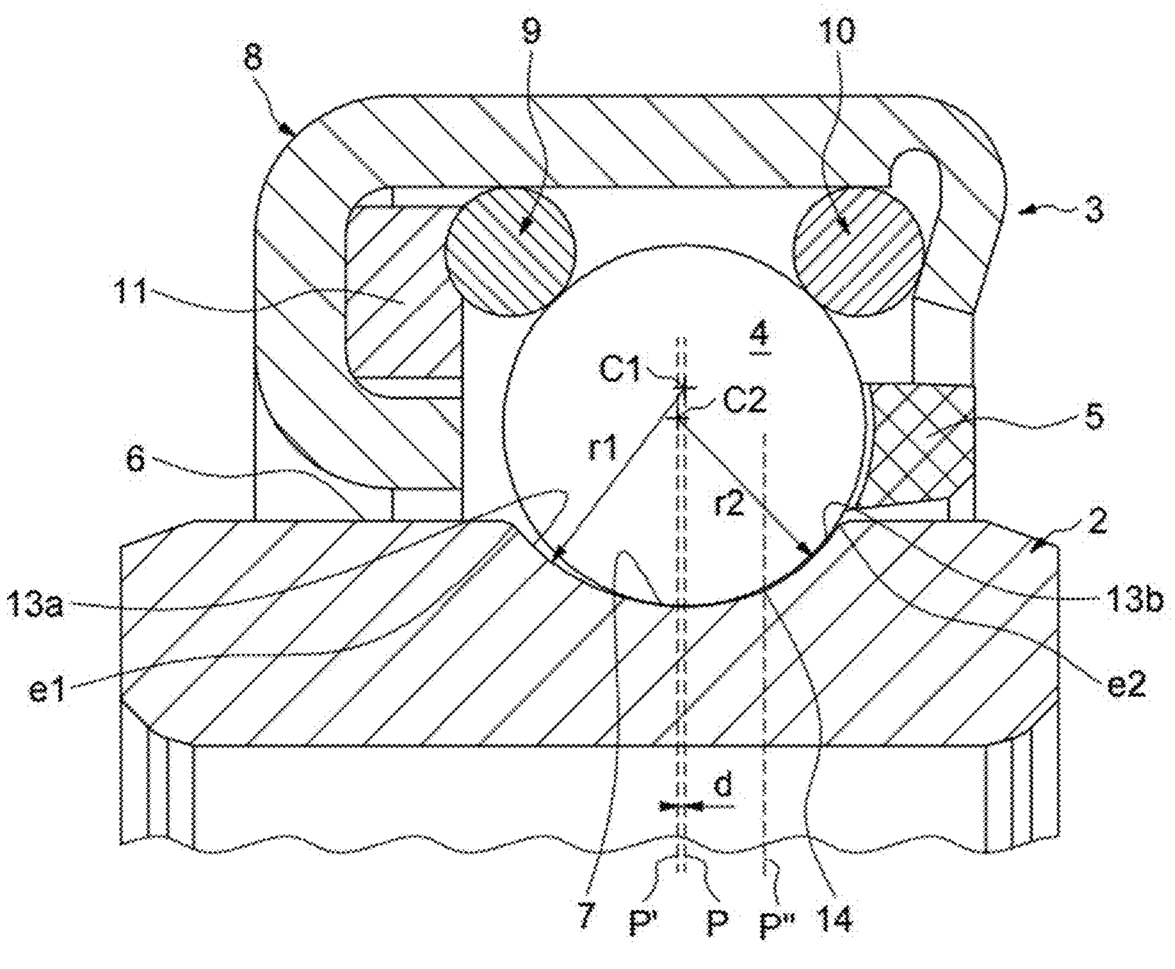
FIG. 2 is a detailed view of FIG. 1.
Figure 3:
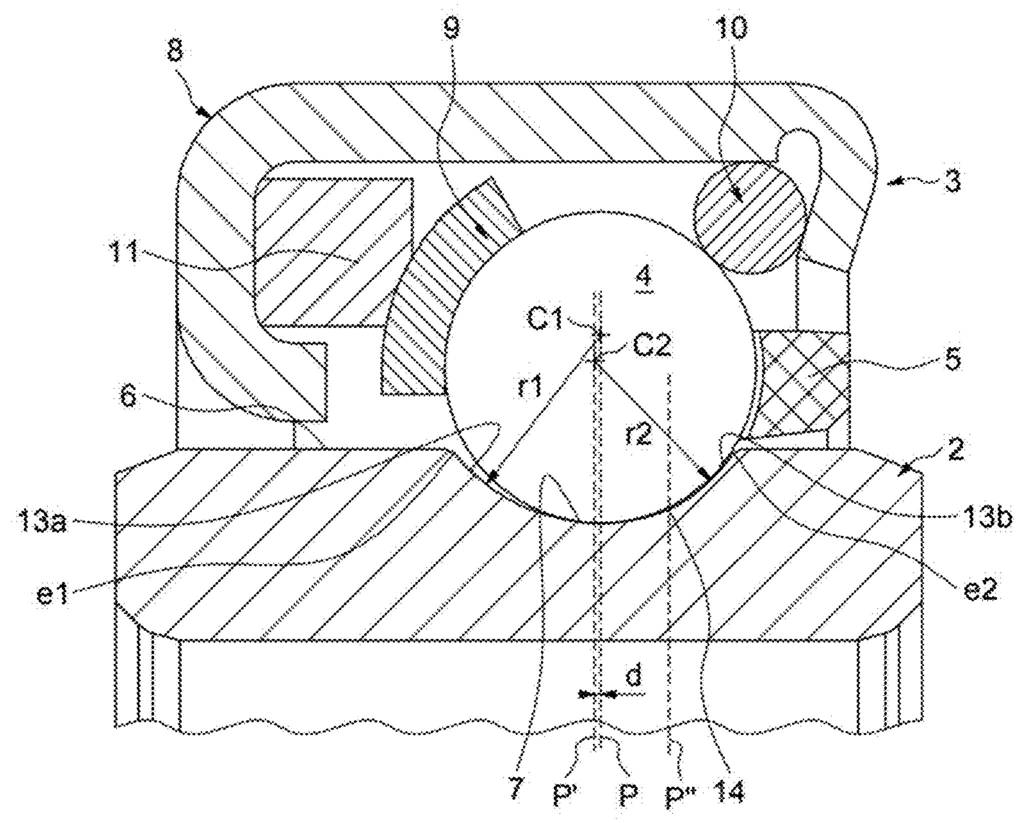
FIG. 3 is a detailed cross-sectional view of a roller bearing according to another exemplary embodiment.
Figure 4:
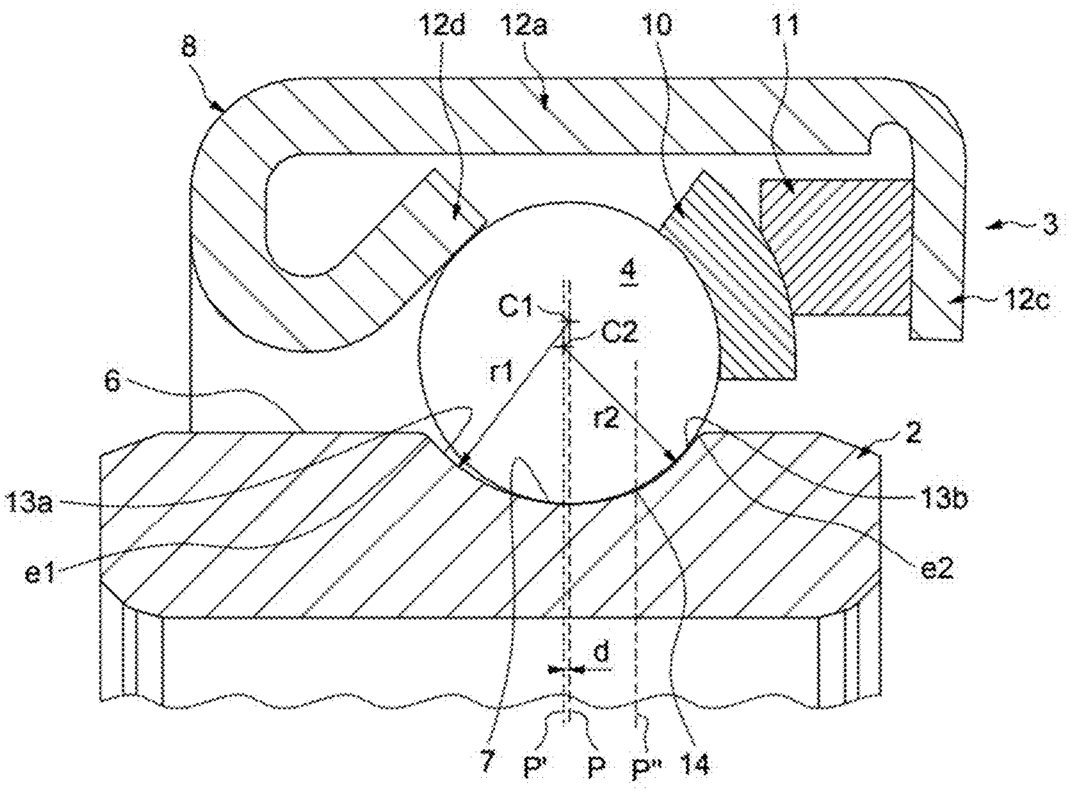
FIG. 4 is a detailed cross-sectional view of a roller bearing according a further exemplary embodiment.

As illustrated more clearly in FIGS. 2, 3 and 4, the raceway 7 of the inner ring 2 is provided with a first axial end e1 and a second axial end e2 that define the axial length of the raceway 7. The first and second axial ends e1, e2 are joined to the annular surface 6 of the inner ring 2. The first and second axial ends e1, e2 are aligned with respect to the axial direction.

The first axial end e1 is located axially on the same side as the prestressing element 11 relative to the radial plane P passing through the center of the balls 4, and the second axial end e2 is located axially on the opposite side.

As illustrated more clearly in FIG. 2, the raceway 7 of the inner ring 2 has, in cross section, a concave inner profile that is asymmetrical relative to a plane P' that is parallel to the radial plane P passing through the center of the balls 4.

The concave inner profile of the raceway 7 includes a first arc 13*a* having a first radius r1 that is located axially on the same side as the prestressing element 11 and a second arc 13*b* having a radius r2 that is located axially on the opposite side from the prestressing element 11. In the embodiment illustrated in FIGS. 1 and 2, the first radius r1 is greater than the second radius r2. The first and second arcs 13*a*, 13*b* have different centers C1, C2; that is, the first arc 13*a* has a first center C1 and the second arc 13*b* has a second center C2. The first center C1 is situated or disposed in the radial plane P (i.e., the plane extending through the center of the balls 4) and the center C2 is situated or disposed in a plane P' parallel to the radial plane P. The first center C1 is radially offset on the same side as the outer ring 3 relative to the second center C2, and axially offset on the opposite side from the prestressing element 11 relative to the second center C2. The plane P' is axially offset on the same side as the first axial end e1 of the raceway 7 relative to the plane P. The axial offset of the planes P and P' is illustrated by the double arrow denoted d. The first arc 13*a* extends from the first axial end e1 of the raceway 7 to a radial plane P" parallel to the plane P. In the embodiment illustrated in the figures, the plane P" is axially offset on the opposite side from the prestressing element 11 relative to the plane P.

The second arc 13*b* extends from the axial end e2 of the raceway 7 to the radial plane P". The arcs 13*a*, 13*b* therefore join each other at a point 14 coincident with the plane P"; in other words, the point 14 lies within the plane P".

By way of example, for a roller bearing 1 having a ball diameter equal to 3.969 millimeters, the first radius r1 of the first arc 13*a* may have a value of two and four tenths millimeters (2.4 mm) and the second radius r2 of the second arc 13*b* may have a value of two millimeters (2 mm). Preferably, the first radius r1 has a value of between 110% and 130% of the value of the second radius r2, and preferably about 120% of the value of the second radius r2.

In this exemplary embodiment, the outer ring 3 comprises two inserts 9, 10 in the form of wires in the casing so as to form the raceways of the outer ring. Alternatively, other designs of the outer ring 3 may be envisaged or provided.

For example, as illustrated in FIG. 3, in which identical elements have the same reference signs, the outer ring 3 comprises an insert 9 in the form of an annular cup that defines a raceway for the balls 4.

In the embodiment illustrated in FIG. 4, in which identical elements have the same reference signs, the outer ring 3 comprises a single insert 10 in the form of an annular cup that defines a raceway for the balls 4, the casing 8 including an oblique extension 12*d* that extends obliquely and defines or provides a raceway for the balls 4. In this example, the prestressing element 11 is preferably arranged axially between the radial portion 12*c* of the casing 8 and the insert 10.

As stated above, in the exemplary embodiments illustrated, the first ring 2 of the bearing 1 is the inner ring and the second ring 3 is the outer ring. Alternatively, a reverse arrangement can be envisaged or provided in which the first ring 2 is the outer ring and the second ring 3 is the inner ring. In this case, the raceway 7 having in cross-section an asymmetrical concave inner profile is formed on the bore of the outer ring that forms an inner surface of the ring.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A roller bearing for a steering column, the roller bearing comprising:

a first ring having a raceway;

a second ring including a casing, at least one insert arranged in the casing so as to form a raceway of the second ring, and at least one prestressing element mounted in the casing and exerting an axial force on the insert; and at least one row of balls arranged between the first ring and the second ring;

wherein the raceway of the first ring has in cross section a concave inner profile that is asymmetrical relative to a plane parallel to a radial plane passing through the center of the balls;

wherein the concave inner profile of the raceway of the first ring includes a first arc, the first arc having a first radius and being located axially on a same side as the prestressing element, and a second arc having a second radius and located axially on a side opposite from the prestressing element, the first arc having a center different than a center of the second arc and the first radius being greater than the second radius.

2. The bearing according to claim 1, wherein the first radius has a value of between 110% and 130% of a value of the second radius.

3. The bearing according to claim 1, wherein the first ring includes an annular surface and each one of the first and second arcs joining with the annular surface.

4. The bearing according to claim 1, wherein the first and second arcs of the concave inner profile of the raceway of the first ring join each other at a point on a plane parallel to the radial plane passing through the center of the balls.

5. The bearing according to claim 1, wherein the at least one insert of the second ring includes two inserts arranged in the casing on either side of the radial plane passing through the center of the balls.

6. The bearing according to claim 5, wherein the two inserts of the second ring are identically formed.

7. The bearing according to claim 1, wherein the first ring is an inner ring of the roller bearing and the second ring is an outer ring of the roller bearing.

* * * * *